March 25, 1930. J. F. CAVANAGH 1,751,977
PISTON RING COMPRESSOR
Filed Feb. 25, 1928
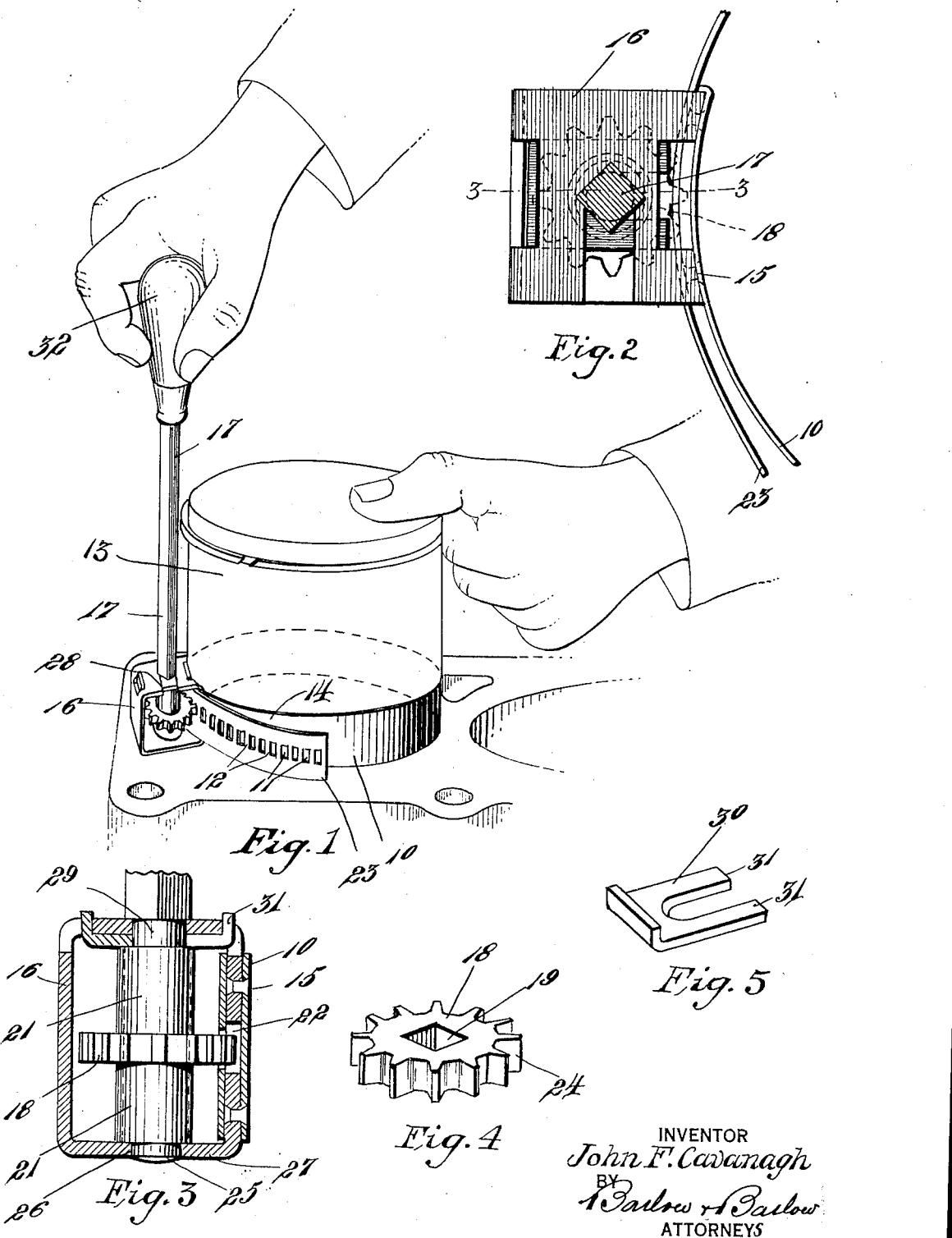
INVENTOR
John F. Cavanagh
BY
Barlow & Barlow
ATTORNEYS Patented Mar. 25, 1930

1,751,977

UNITED STATES PATENT OFFICE

JOHN F. CAVANAGH, OF PROVIDENCE, RHODE ISLAND

PISTON-RING COMPRESSOR

Application filed February 25, 1928. Serial No. 256,942.

This invention relates to assembling tools used in positioning pistons in a gasoline engine block; and has for its object to provide a tool which is quickly adjustable to the various piston diameters in common use.

Another object of the invention is simplicity and economy of construction and ease of operation.

With these and other objects in view, the invention consists of certain novel features of construction, as will be more fully described, and particularly pointed out in the appended claims.

In the accompanying drawings:

Fig. 1 is a perspective view showing my improved piston ring compressor in operative position on a piston with the piston about to be positioned in an engine block.

Fig. 2 is a plan view of the actuating mechanism with the handle and a portion of the band removed.

Fig. 3 is a partial sectional view taken on line 3—3 of Fig. 2.

Fig. 4 is a perspective view of the gear member of the actuating mechanism.

Fig. 5 is a perspective view of the assembly locking member.

It is a well known fact that piston rings are so constructed as to have a tendency to expand to a diameter considerably greater than the bore in which they are confined to firmly engage the walls of the cylinder. The expanded condition of piston rings on a piston which is about to be positioned in a cylinder offers great impediment to the assembling operation and in order to avoid this I confine the rings by my improved tool to substantially the diameter of the piston, whereby the piston may be readily slipped into place in the block; and the following is a detailed description of the present embodiment of my invention and showing one means by which these advantageous results may be accomplished:—

With reference to the drawings, 10 designates a flexible band made preferably of spring brass or tempered steel which is provided along one end portion with spaced openings 11 leaving teeth 12 of a rack. The band is bent into substantially circular form adapted to encircle a piston 13 with the rack portion overlapping an imperforate portion 14. Mounted upon one end of the band by rivets 15 is a frame 16 in which a shaft 17 is rotatably mounted. This shaft is preferably of square cross section to provide a positive locking engagement for the pinion gear 18, which has a square hole 19 to receive said shaft 17, as shown in Fig. 3. An operating handle 20 is provided on the free end of the shaft. Spacing sleeves 21 are mounted upon the shaft on both sides of the gear 17 to positively keep the gear in a predetermined position with respect to the ends of the frame 16. The frame 16 is provided with a recess 22 to permit the gear 18 to enter a predetermined distance from the inner surface of the frame for unobstructed rotation thereof.

The free end 23 of the band 10 is slipped between the inner surface of the frame 16 and the gear 17 with the teeth 24 extending through the band perforations 11 and into the recess 22.

The shaft is machined to cylindrical form at 25, see Fig. 3 and finds a bearing in the opening 26 in the lower wall or plate 27 of the frame, while the upper wall or plate is slotted as at 28 to receive the cylindrical portion 29 of the shaft 18. The cylindrical portion 29 is of a sufficient length to receive the locking member 30 which may have its bifurcated ends 31 bent to hold the same in position after assembly of the shaft on the frame.

In assembling the device, one end of the band 10 is first riveted to the frame 16, as shown in Fig. 2. The gear 18 and the spacing sleeves 9 are then positioned upon the shaft 17 and the lower end 25 of the shaft is then inserted into the hole 26 in the lower wall of the frame and the shaft is then swung through the slot 28 into its normal position. The locking member 30 is then slipped into locking engagement with the shaft 18 and the ends 31 of the arms of the locking member 20 are then bent upwardly to prevent the locking member from becoming disengaged, as is clearly shown in Fig. 3.

In operating my improved device, the lower end of the piston is first inserted into the cylinder until the lowermost piston ring engages the cylinder thus preventing further entrance. The piston ring compressor is then slipped over the piston, taking the position shown in Fig. 1, and outside of the lowermost piston ring. The handle 32 is then turned in the proper direction to contract the band 10 and thus force inward the piston ring to practically the same diameter of its piston. Bearing downward with one hand on top of the piston during the above described operation, will cause the piston to further enter the cylinder, carrying along the ring with it. The piston ring compressor is then expanded to receive the next ring and the previous operation is repeated. Thus the piston is quickly and easily positioned in the block.

The novel method of assembling enables the device to be sold in a partially disassembled or "knock-down" condition and thus occupy a much smaller package than otherwise would be the case.

This device, as will be seen, is adapted to rapid and inexpensive manufacturing and for this reason can be sold at a comparatively low price.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A piston ring compressing tool comprising a band of a length greater than the circumference of a piston, an operating shaft, means attached to one portion of the band for mounting said shaft in a position parallel to the axis of the piston to be encircled, toothed means keyed to said shaft and formations on said band to be engaged thereby for moving the same to contracted or expanded position.

2. A piston ring compressing tool comprising a band of a length greater than the circumference of a piston, an operating shaft, means attached to one end portion of the band for slidably receiving the other end portion of the band therethrough and for rotatably mounting said shaft in a position parallel to the axis of the piston to be encircled, and toothed means keyed to said shaft and formations on said slidable received end portion of the band to be engaged thereby for moving the same to contract or expand the piston encircling portion.

3. A piston ring compressing tool comprising a band of a length greater than the circumference of a piston, an operating shaft, means attached to one end portion of the band for slidably receiving the other end portion of the band therethrough and for rotatably mounting said shaft in a position parallel to the axis of the piston to be encircled, there being formations on portions keyed to said shaft and on the portion of the band slidably extending through the shaft for interengagement to contract or expand the piston encircling portion of the band.

4. A piston ring compressing tool comprising a band of a length greater than the circumference of a piston, an operating shaft, means attached to one end portion of the band for slidably receiving the other end portion of the band therethrough having spaced openings therein and for rotatably mounting said shaft in a position parallel to the axis of the piston to be encircled, a pinion keyed to said shaft, the teeth of which extend into said openings in the band and cause a contracting or expanding movement thereof upon rotation of said pinion by said shaft.

5. In a piston ring compressing tool, a band of a length greater than the circumference of a piston and having spaced openings therein forming a rack, an operating shaft, a pinion keyed to said shaft for engagement with said rack to cause a movement of the band upon rotation of said shaft.

6. A piston ring compressing tool comprising a band of a length greater than the circumference of a piston to be encircled and having spaced openings in one end portion to form a rack, the rack portion of said band overlying an imperforate portion when in working position, a frame secured to said imperforate portion and standing outwardly therefrom through which said rack portion slidably extends, an operating shaft rotatably mounted in said frame and positioned parallel to the axis of the piston which it encircles, a pinion keyed to said shaft engaging said rack, and a handle on said shaft to rotate the same to cause a contracting or expanding of the piston encircling portion of the tool.

In testimony whereof I affix my signature.

JOHN F. CAVANAGH.